(12) United States Patent
Woo

(10) Patent No.: US 6,681,125 B1
(45) Date of Patent: Jan. 20, 2004

(54) WIRELESS TELECOMMUNICATION TERMINAL

(75) Inventor: Jong-Myung Woo, Department of Radio Sciences and Engineering Chungnam-University, 22 Koong-dong, Youseong-gu, Taejon (KR)

(73) Assignees: Jong-Myung Woo, Ichon (KR); Cerastack Co., Ltd., Kyonggi-do (KR)

( * ) Notice: Subject to any disclaimer, the term of this patent is extended or adjusted under 35 U.S.C. 154(b) by 0 days.

(21) Appl. No.: 09/546,631

(22) Filed: Apr. 10, 2000

(30) Foreign Application Priority Data

Apr. 8, 1999 (KR) .......................................... 1999-12415

(51) Int. Cl.$^7$ ................................................ H04M 1/00
(52) U.S. Cl. ...................................... 455/575; 455/106
(58) Field of Search .................. 455/90, 106, 550, 455/575, 566, 90.3, 550.1, 575.1, 575.3, 575.5, 575.7; 379/433.01, 433.02, 433.03, 433.04, 433.07; 343/702

(56) References Cited

U.S. PATENT DOCUMENTS 5,542,106 A * 7/1996 Krenz et al. ................... 455/90
5,901,222 A * 5/1999 Macor ........................ 379/433

FOREIGN PATENT DOCUMENTS

FR 2679086 * 1/1993 ............ H04M/1/02

* cited by examiner

Primary Examiner—Lee Nguyen
(74) Attorney, Agent, or Firm—Robert E. Bushnell, Esq.

(57) ABSTRACT

Disclosed is a wireless telecommunication terminal constructed with a housing in which a transmitter/receiver module is received; an earpiece is disposed at the upper portion of the front face of the housing; a liquid crystal display is disposed below the earpiece; a keypad having a plurality of keys and functional buttons is disposed below the liquid crystal display; a cover is rotatably hinge-coupled to the housing; and an antenna established either on the surface of the cover or inside of the cover. The antenna is preferably constructed as either a plane monopole antenna, a plane dipole antenna, a slot antenna, a reverse F antenna, a reverse L antenna, or a micro-strip antenna.

20 Claims, 4 Drawing Sheets

WIRELESS TELECOMMUNICATION TERMINAL

CLAIM OF PRIORITY

This application makes reference to, incorporates the same herein, and claims all benefits accruing under 35 U.S.C. §119 from my application WIRELESS TELECOMMUNICATION TERMINAL filed with the Korean Industrial Property Office on the $8^{th}$ day of Apr. 1999 and there duly assigned Serial No. 12415/1999.

BACKGROUND OF THE INVENTION

1. Field of the Invention

The present invention relates to wireless telecommunication processes and terminals, and, more particularly, to wireless communication terminals and processes that minimize exposure of the anatomy of human users to the influence of electromagnetic waves while using human engineering to simultaneously facilitate ease of use.

2. Description of the Related Art

Generally, wireless portable telecommunication terminals, better known as potable telephones, transmit microwavelength signals (e.g., microwaves, or microwave signals). These microwave signals are transmitted either wirelessly through the atmosphere or through telecommunication transmission lines to either a mobile station or to a base station.

The conventional flip type wireless telephone terminal, which has a hinge-coupled cover covering the key pads, like the conventional fold type terminal, has a retractable antenna assembly disposed at the upper edge portion of its housing. In these wireless portable telecommunication terminals, the antenna assembly is generally constructed with a pair of antennas, namely a helical antenna used only for the stand-by mode of the equipment and a whip antenna used for high gain transmission. The whip antenna is first extracted from the housing for the terminal, and then electromagnetic waves are radiated from the whip antenna through an electric current distribution formed on outer surface of the body of the housing. The radiated electromagnetic waves have a characteristic of radiating in all directional due to the constitution of the whip antenna. As a result, the electromagnetic waves may be radiated directly into the user's human brain. Antenna efficiency in the backward direction of the brain may be lowered because the electromagnetic waves may be attenuated by the user's human brain. Moreover, electromagnetic waves radiated from the inside of the housing of the terminal pass through the housing of the terminal and are transferred into the user's brain, resulting in a risk of harm to the human body. Furthermore, when harmful electromagnetic waves are directly transferred into the user's brain over a long time period, there may occur headaches, birth defects, and visual hindrance, among other effects, all of which are serious problems for the human body.

In a conventional folding type terminal, the antenna is placed at the upper edge of the lower housing. The upper housing of the terminal encloses electrically conducting circuits however, and functions as a reflective plate that reflect the electromagnetic waves generated from the antenna. The reflection lowers the efficiency of the terminal in radiating electromagnetic waves from the antenna in the direction of the user's body.

I have also noticed that the liquid crystal display screen is located in the upper portion of the main body in the conventional flip type terminal, and in the upper housing in the folding type terminal, while the keypad is located in the lower portion of the main body in the conventional flip type terminal and in the folding type terminal. Consequently, the user must use one hand to hold the terminal and the other hand to depress the keys of the keypad because the construction of the terminal prevents the hand used to hold the terminal from also being used to press the key of the keypad.

SUMMARY OF THE INVENTION

It is therefore an object of the present invention to provide an improved telecommunications process and apparatus enabling handheld wireless communication.

It is another object to provide a telecommunications process and wireless terminal that minimizes direct transfer of electromagnetic waves emanating from both the antenna of the terminal and the body of the terminal into the user's brain.

It is still another object to provide a telecommunications process and wireless terminal that reduces exposure of the human brain to electromagnetic radiation during operational use of the terminal and simultaneously allows the key pads of the selection part to be pressed with ease by using the one hand holding the terminal without using another hand.

It is yet another object to provide a process and terminal enabling wireless electromagnetic communication while the antenna of the terminal is substantially displaced from the vicinity of the user's brain.

It is a further another object to provide a process and terminal accommodating wireless electromagnetic communication with an antenna extending from the terminal, propagating electromagnetic radiation in a location other than in the vicinity of the user's brain.

It is still yet another object to provide a telecommunications process and terminal with a housing of the circuit for the terminal that does not shield or reflect radiation emanating from the antenna.

These and other objects may be attained with a wireless telecommunication process and terminal that may be practiced with an earpiece, a liquid crystal visual display part, a keypad having a plurality of key pads or buttons, and a microphone located, in order, proceeding from the upper portion of the front face of a housing for the terminal to the lower portion. A cover may be rotatably hinge-coupled to the housing, with an antenna supported by the cover.

According to another aspect of the invention, a wireless telecommunications terminal may be constructed with an upper housing, and a lower housing rotatably hinge-coupled to the upper housing. A receiver part and a liquid crystal display part are disposed at the upper portion of the front face of the upper housing. A keypad is including a plurality of key and buttons, together with voice microphone, are disposed within the lower housing, and an antenna, preferably a retractable whip antenna, is located in the bottom portion of the lower housing.

According to still another aspect of the invention, a wireless telecommunication terminal may be constructed with an upper housing rotatably hinge-coupled to a lower housing. An earpiece and a keypad with a plurality of keys and buttons may be located in the upper housing. A microphone and a liquid crystal display may be located in the lower housing. An antenna, preferably a whip antenna, may be located in the lower portion of the lower housing.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
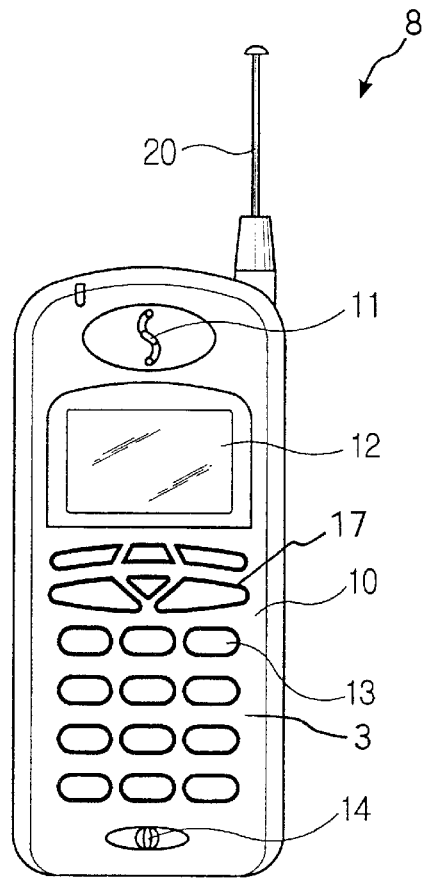
FIG. 1 is a front view of a flip type wireless telecommunication terminal.

Turning now to FIG. 1, a flip type telecommunications terminal such as a hand-held, portable wireless telephone 8, is illustrated in with a cover that covers a key pad 3 formed by a plurality of spaced-apart alphanumeric keys 13 and a separate plurality of function keys 17, hinge-coupled to a housing 10. Housing 10 encases a receiver 11 (i.e., an "earpiece") that may be located at the upper portion of the front face of housing 10 of terminal 8, a liquid crystal display screen 12 that illuminates visual displays of images and is located below earpiece 11, and keypad 3 that is disposed below liquid crystal display screen 12. Terminal 8 also includes a transmitter 14 (i.e., a microphone) located below the lowest portion of keypad 3. A retractable and extendable antenna 20 for the flip type terminal is disposed at the upper edge portion of the lower housing 10.

Figure 2:
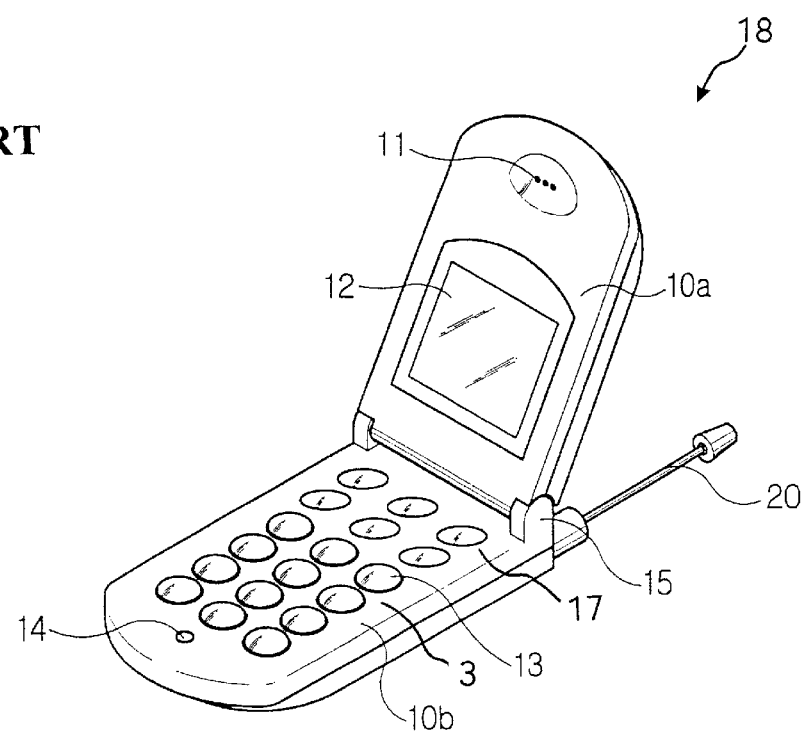
FIG. 2 is a perspective view of a fold type wireless telecommunication terminal.

FIG. 2 illustrates a folding type terminal 18, with nearly the same constitution as the flip type terminal of FIG. 1. An upper housing 10a is connected by a hinge 15 to rotate about a lower housing 10b, with upper housing 10a being foldable when rotated around the axis of hinge 15 onto lower housing 10b. A retractable and extendable antenna 20 for the fold type terminal, is disposed at the upper edge portion of the lower housing 10b.

In these wireless portable telecommunication terminals, antenna 20 is generally constructed with a pair of antennas, namely a helical antenna that may be used only for a stand-by mode of the equipment, and a whip antenna used for high gain reception and transmission. During telecommunications while using terminal 8, 18, the whip antenna is first withdrawn and extended from housing 10 of terminal of FIG. 1, or lower housing 10a of FIG. 2, respectively, and then electromagnetic waves radiate from whip antenna 20 through an electric current distribution formed on outer surface of housing 10 or lower housing 10a. At this time, the radiating electromagnetic waves have a characteristic of omni-directional irradiation due to the constitution of the whip antenna. Electromagnetic waves radiating from the inside of the housing of the terminal pass through the housing of the terminal and are transferred into the user's brain, resulting in possible harm to the human body. As a result, the electromagnetic waves may be radiated directly into the human brain of the user and thereby expose the user's human brain to a substantial amount of electromagnetic energy. Moreover, the efficiency of the antenna in the backward direction toward the brain may be lowered because propagation of the electromagnetic waves in that direction will be shielded by the user's human brain. Furthermore, when harmful electromagnetic waves are directly transferred into the user's brain over an extended period of time, there is a widely held suspicion that other affect may occur, such as a headache, the birth of monstrous or otherwise anatomically defective baby, and visual hindrance of the user, all of present serious problems to the human body of the user.

When a wireless terminal is designed with antenna 20 placed at the upper edge of the lower housing 10b in a folding type terminal 18 as shown in FIG. 2, upper housing 10a of the terminal functions as a reflective plate and reflects the electromagnetic waves generated from the antenna. Due to this reflection, the efficiency in radiating electromagnetic waves from the antenna is lowered in the direction beyond the user's body. Since the liquid crystal display screen 12 is located at the upper portion of the main body in a conventional flip type terminal 8 and at the upper housing 10a in the folding type terminal, keypad 13 with its plurality of keys 13, 17 is disposed within the lower portion of main body 10 in flip type terminal 8 and within the lower housing 10b in the folding type terminal 18, the hand of the user that is holding terminal 8, 18 can not also be used to depress keys 13, 17; consequently, the user must use the other hand to depress the keys of keypad 13.

Figure 3:
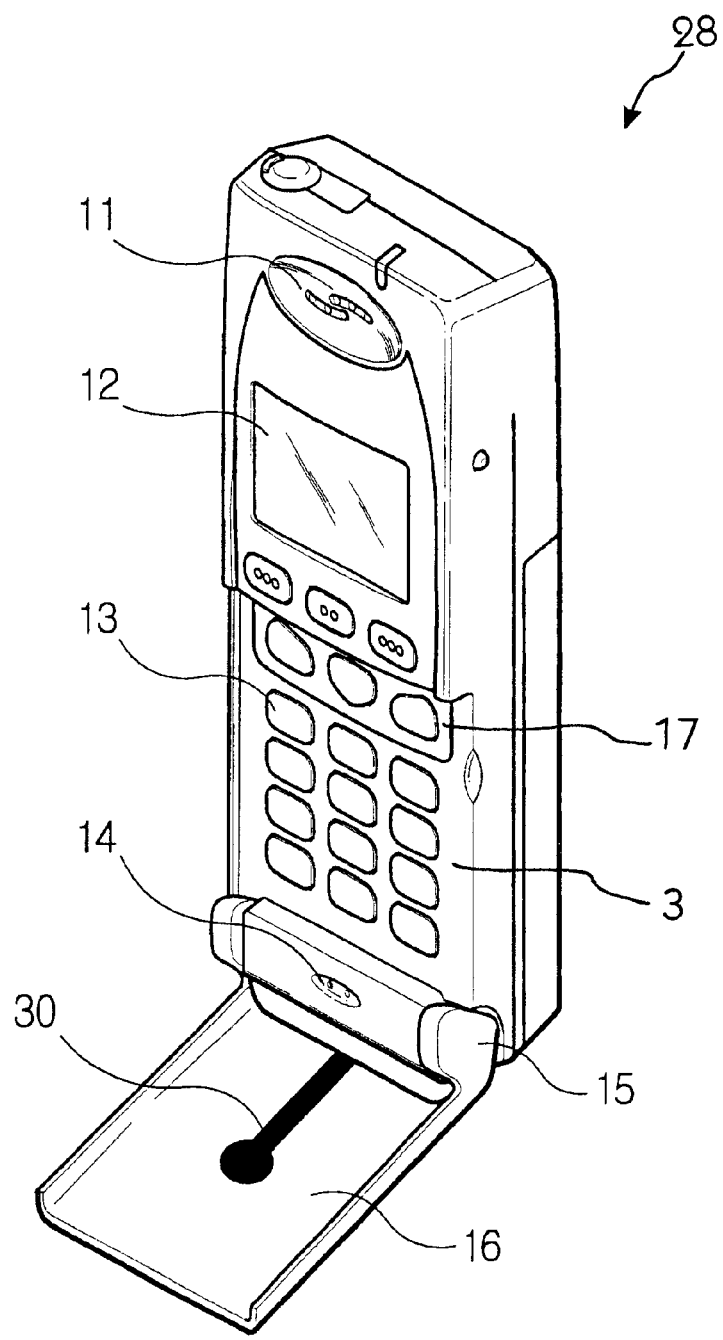
FIG. 3 is a perspective view of a flip type wireless telecommunication terminal constructed according to the principles of the present invention.

Turning now to FIG. 3, an embodiment constructed according to the principles of the present invention is illustrated with a flip type wireless telecommunication terminal 28. Terminal 28 has a housing 10 and a cover 16 that is rotatably attached by hinge 15 to housing 10. A receiver speaker 11 (e.g., the earphone speaker, or "earpiece") is located at the upper portion of the front face of the housing 10. A liquid crystal display 12 is disposed below earpiece 11. Keypad 13 includes a plurality of keys (or buttons) are arranged below the liquid crystal display 12. A transmitter 14 (e.g., a mouthpiece microphone) is located below keypad 13. Antenna 30 is disposed on cover 16 and may be mounted either on an inner surface of cover 30 or embedded inside of cover 16. In different embodiments, either a planar monopole antenna, a planar dipole antenna, a slot antenna, a reverse F antenna, a reverse L antenna, or a micro-strip antenna, among other types of microwave antennas, may be used as antenna 30. Antenna 30 is positioned to extend beyond and below microphone 14. Consequently, during operational use of terminal 28, while the user positions earpiece 11 adjacent to the user's ear with microphone 14 adjacent to the user's mouth, antenna 30 extends well below the jaw of the user.

Figure 4:
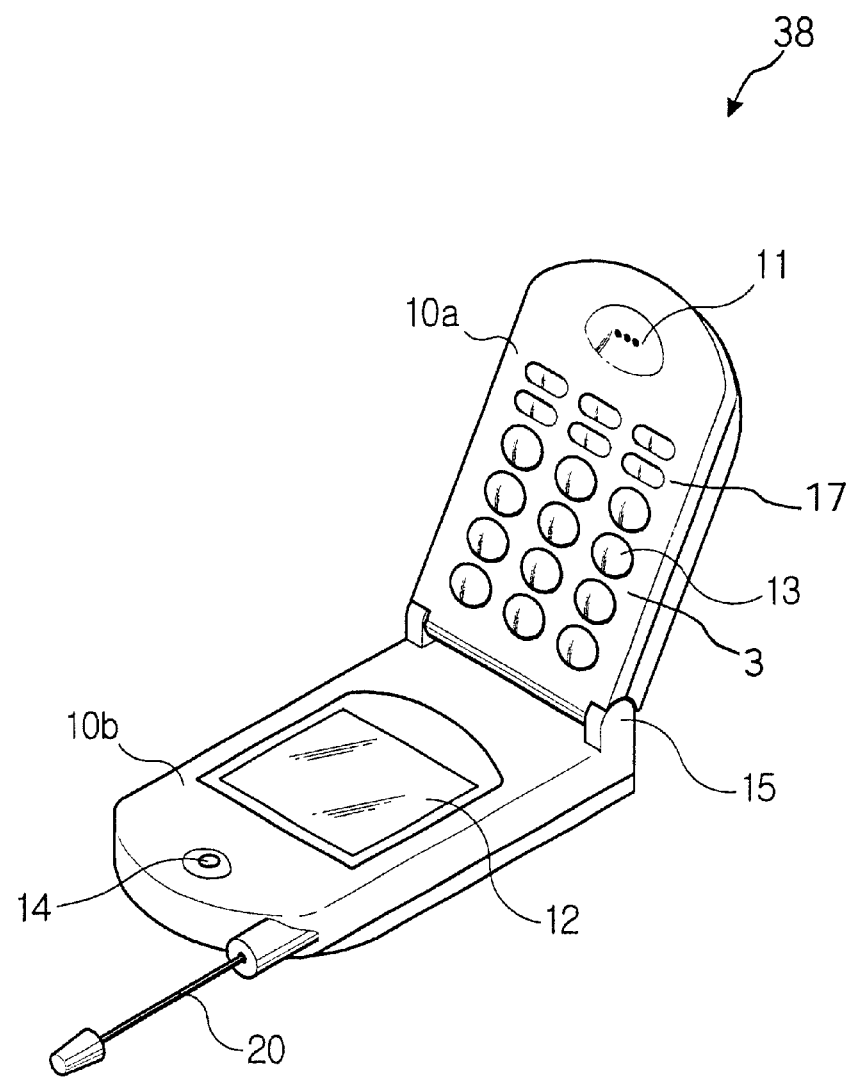
FIG. 4 is a perspective view of a folded type wireless telecommunication terminal constructed according to the principles of the present invention.

FIG. 4 shows a fold type wireless telecommunication terminal 38 including an upper housing 10a and a lower housing 10b that is rotatably hinge-coupled to the upper housing 10a. Earpiece 11 and keypad 13 are resident within upper housing 10a, while the visual display 12 and microphone 14 are resident within lower housing 10b. Earpiece 11 and microphone 14 are located at opposite extremities of upper housing 10a and lower housing 10b, respectively. In terminal 38, a retractable and extendable whip antenna 20 is disposed with the lower portion of a lower housing 10b. Antenna 20 is positioned along one side of the terminal end of lower housing 10b, to extend beyond and below microphone 14. Consequently, during operational use of terminal 38 while earpiece 11 is adjacent to the user's ear and microphone 14 is adjacent to the user's mouth, antenna 20 extends well below the jaw of the user.

Figure 5:
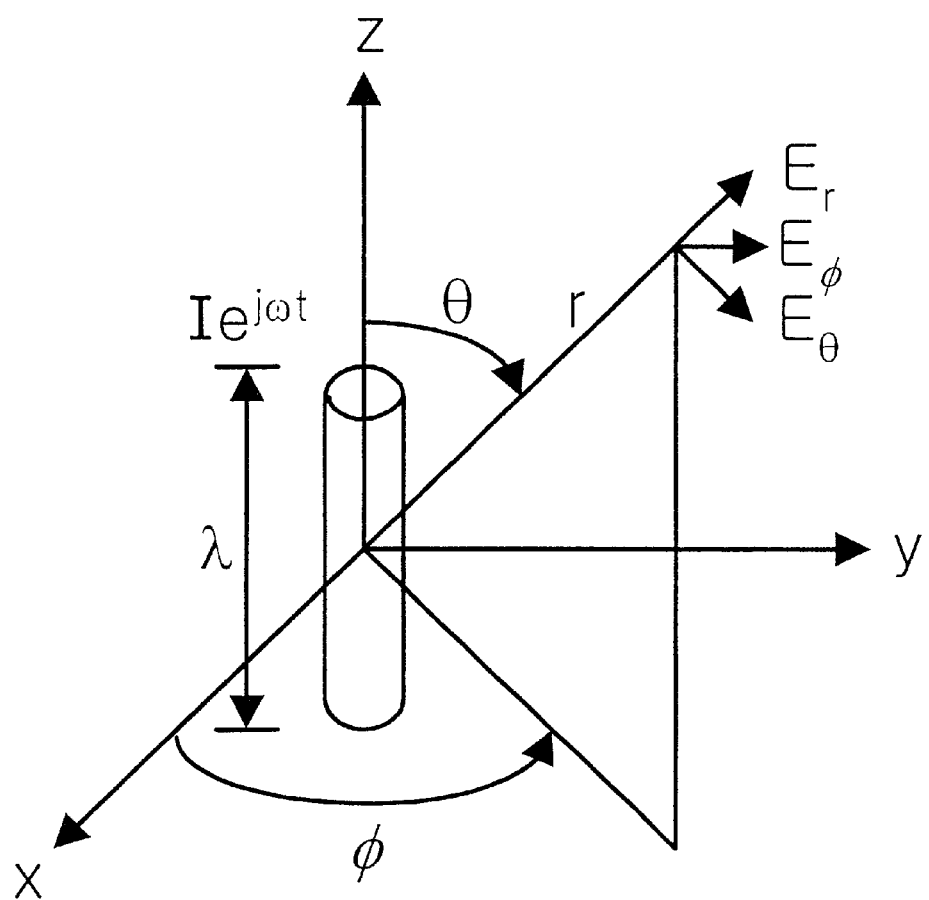
FIG. 5 is a micro-dipole coordinate system showing the influence of electromagnetic waves.

With the construction illustrated by the foregoing embodiments, antennas 30, 20 respectively, of FIG. 3 and FIG. 4 may be separated by a distance of approximately ten centimeters from the user's brain during operational usage of the equipment to orally communicate via terminals 28, 38 with another telephone subscriber. Consequently, the intensity of the electromagnetic wave is weaker in the vicinity of the user's brain, resulting in a diminution of the risk of an adverse influence on the user's brain. For example, and referring now to FIG. 5, when a constant electric current, $Ie^{jwt}$ flows through a conductive line such as a dipole antenna having a length of l, an electric field and magnetic field generated is as follows:

$$E_r = \frac{Il\eta_0}{2\pi}\left[\frac{1}{r^2} - j\frac{1}{Br^3}\right]\cos\theta e^{-j\beta r} \quad (1)$$

$$E_\theta = \frac{Il\eta_0}{4\pi}\left[\frac{j\beta}{r} + \frac{1}{r^2} - j\frac{1}{\beta r^3}\right]\sin\theta e^{-j\beta r}$$

$$E_\phi = 0$$

$$H_r = 0$$

$$H_\theta = 0$$

$$H_\phi = \frac{Il}{4\pi}\left[j\frac{\beta}{r} + \frac{1}{r^2}\right]\sin\theta e^{-j\beta r}$$

where, $\beta$ is a phase integer and $\eta 0$ is the specific impedance in atmospheric air.

$$P = \frac{1}{2}R_e(E \times H) \quad (2)$$

$$= \frac{1}{2}[|E_r|^2 + |E_\theta|^2], \left(P \propto \left(\frac{1}{r^1}\right)^2 + \left(\frac{1}{r^2}\right)^2 + \left(\frac{1}{r^3}\right)^2\right)$$

The average point vector does not contribute to the radiation of the electromagnetic waves in the near field while non-effective power which is accumulated near the antenna, largely contributes to the radiation of the electromagnetic waves. In other words, since the user's brain is included within the near field of the antenna of the terminal, the user's brain is largely influenced by an effective and non-effective power component of $E_r$ as well as the $E_\theta$ component. In the far-field however, the electric and magnetic fields are respectively expressed as follows:

$$E_\theta = j\frac{\eta_0 Ile^{-j\beta r}}{2\lambda r}\sin\theta \quad (3)$$

$$H_\phi = j\frac{Ile^{-j\beta r}}{2\lambda r}\sin\theta$$

Accordingly, the average point vector P may be expressed as follows:

$$P = \frac{1}{2}|E_\theta|^2, \left(P \propto \left(\frac{1}{r}\right)^2\right) \quad (4)$$

In other words, since the average point vector P is proportional to $(1/r)^2$, the influence on the user's brain by the electromagnetic wave decreases in proportional to $(1/r)^2$, as an inverse squared of the distance. When the central frequency of the microwave used for personal communication service (PCS) is 1.8 Giga-Hertz (i. e., with a wavelength $\lambda$: 16.7 centimeters) and when the antenna is a half wavelength dipole, a boundary of the near-field is within 3.65 cm depending on $$0.62\sqrt{\frac{D^3}{\lambda}},$$

Where D is the length of the antenna and a boundary of the far-field is within 8.33 centimeters depending on $$\frac{2D^2}{\lambda}.$$

Thus, in the conventional flip and folding type wireless telephone terminals, the distance between the antenna and the user's brain is within the near-field while in a flip or a folding type of wireless telephone terminal constructed according to the principles of the present invention, the distance between the antenna and the user's brain is at least ten centimeters and more, which sufficient removes the user's brain sufficiently outside of the near field and well into the far-field. Therefore, during of the wireless telephone terminals constructed according to the principles of the present invention, the influence of the equipment on the user is reduced to radiation within the far-field where the intensity of the electromagnetic wave is inversely proportional to the second power of the distance between the user's brain and the antenna of the terminal.

Returning again to FIG. 4, the folding type wireless telecommunication terminal 38 may be constructed with liquid crystal display 12 disposed within lower body portion 10*b* and keypad 13 disposed within upper body portion 10*a*. During general use of folding type terminal 38, a hinge-coupled portion of terminal 38 and an adjacent portion to the hinge-coupled portion are held on the inner surface of one of the user's hands by four finger, without reliance upon the user's thumb. Consequently, since the thumb is freely movable, the user may press some or all of the keys and buttons of keypad 13 with the thumb of the same hand that is used to hold terminal 38. This enables the user to more easily depress the keys and the buttons.

As described in the details of the foregoing paragraphs, according to the principles of the present invention, wireless telephone terminals may be constructed with an antenna disposed at the cover that covers the keypad in the flip type terminal and may be disposed at the bottom edge of the lower main body in the folding type terminal. Therefore, the distance between the antenna and user's brain is increased by approximately five times in comparison to the distance in conventional terminals, and the influence of the electromagnetic waves are decreased in inversely proportional to the second power of the distance between the antenna and the user's brain. Moreover, embodiments of the present invention have an advantage in that a part of the brain escapes from the influence of radiation with the non-effective power zone. Furthermore, during general use of the folding type terminal a hinge-coupled portion of the terminal and an adjacent portion to the hinge-coupled portion are maintained within the inner surface of the user's one hand and the four finger of that hand, thereby leaving the thumb of that hand freely movable to depress the keys and buttons of keypad 13 by using thumb of the same hand. This enables the user to depress the keys and buttons with ease.

The present invention is not limited to the above-described embodiments. Various changes and modifications may be effected by one having an ordinary skill in the art and remain within the scope of the invention, as defined by the appended claims.

What is claimed is:

1. A wireless telecommunication terminal, comprising:
   a housing in which a transmitting/receiving module is received;
   an earphone disposed in an upper portion of a front face of the housing when said terminal is handheld in operational use;
   a liquid crystal display part disposed below said earphone when said terminal is handheld in operational use;
   a keypad comprising a plurality of keys and buttons disposed below said liquid crystal display when said terminal is in operational use;
   a microphone borne by said housing, disposed below said keypad when said terminal is handheld in operational use;
   a cover rotatably hinge-coupled to a lower portion of the housing; and
   an antenna established in said cover to be extend away from a structure of said housing bearing said microphone to a position below said microphone when said terminal is handheld in operational use.

2. The wireless telecommunication terminal of claim 1, wherein the antenna is established on an inner surface of said cover.

3. The wireless telecommunication terminal of claim 1, wherein said antenna is established within an interior of said cover.

4. The wireless telecommunication terminal of claim 1, wherein the antenna is selected from a group comprised of a plane monopole antenna, a plane dipole antenna, a slot antenna, a reverse F antenna, a reverse L antenna, and a micro-strip antenna.

5. The wireless telecommunication terminal of claim 1, further comprised of said cover extending obliquely outwardly away from said front face and downwardly below said microphone while said opened terminal is in an opened operational state.

6. The wireless telecommunication terminal of claim 1, further comprised of said antenna being retactably received within said cover to reciprocate between a retracted position within said cover and a deployed operational position with said antenna extending obliquely outwardly away from said front face and downwardly below said microphone while said opened terminal is in an opened operational state.

7. A wireless telecommunication terminal, comprising:
   a housing having an upper housing and a lower housing rotatably hinge-coupled to said upper housing;
   an earpiece disposed at an upper portion of the front face of the upper housing;
   a liquid crystal display disposed below said earpiece;
   a keypad comprised of a plurality of keys, disposed at a lower portion of a front face of said upper housing;
   a microphone disposed below said key pad; and
   an antenna established in a lower portion of said lower housing to extend away from a structure of said handheld housing bearing said microphone to a position below said microphone when said terminal is handheld and in operational use.

8. The wireless telecommunication terminal of claim 7, wherein the antenna comprises a whip antenna.

9. The wireless telecommunication terminal of claim 7, further comprised of said lower housing extending obliquely outwardly away from said microphone and downwardly below said microphone while said opened terminal is in handheld use in an opened operational state.

10. The wireless telecommunication terminal of claims 7, further comprised of said antenna positioned to reciprocate between a retracted position with said antenna being retactably received within said lower portion of said housing and a deployed operational position with said antenna extending obliquely outwardly away from said microphone and downwardly below said microphone while said opened terminal is in handheld use in an opened operational state.

11. A wireless telecommunication terminal, comprising:
   a housing having an upper housing and a lower housing rotatably hinge-coupled to said upper housing;
   an earphone disposed within an upper portion of a front face of said upper housing;
   a keypad comprising a plurality of keys, disposed below said earphone within said upper housing;
   a liquid crystal display disposed at an upper portion of a front face of said lower housing;
   a microphone disposed below said liquid crystal display; and
   an antenna established in a lower end of said lower housing to be deployed from said housing to extend beyond a structure provided by said housing and below said microphone when said terminal is handheld and in operational use.

12. The wireless telecommunication terminal of claim 11, further comprised of said antenna extending obliquely outwardly away from said microphone and downwardly below said microphone while said opened terminal is in handheld use with said lower housing being in an opened operational state.

13. The wireless telecommunication terminal of claim 11, further comprised of said antenna being retactably received within said lower end of said lower housing to reciprocate between a retracted position within said lower housing and a deployed operational position with said antenna extending obliquely outwardly away from said earphone and downwardly below said earphone while said opened terminal is in handheld use with said lower housing being in an opened operational state.

14. The wireless telecommunication terminal of claims 11, further comprised of said antenna being borne by said lower end of said lower housing to extend in a deployed operational position with said antenna extending obliquely outwardly and away from said earphone, and downwardly below said earphone while said opened terminal is in handheld use with said lower housing being rotated away from said upper housing.

15. A wireless telecommunication terminal, comprising:
   a handset having an upper housing and a lower housing rotatably hinge-coupled to extend obliquely outwardly from a front face of said upper housing while said terminal is in an opened operational state, and to fold against said front face while said terminal is in a closed physical state;
   an earpiece disposed at an upper portion of said upper housing;
   a keypad comprised of a plurality of keys, disposed on a front face of said lower housing;
   a variable visual display responsive to manual manipulation of said keys, disposed below said earpiece;
   a microphone disposed below said keypad; and
   an antenna established in a lower portion of said lower housing to be deployed to extend obliquely outwardly and downwardly beyond a structure provided by said lower housing and below said microphone while said terminal is in handheld use and in said opened operational state.

16. The wireless telecommunication terminal of claim 15, further comprised of said antenna being borne by said lower portion of said lower housing to extend in a deployed operational position with said antenna extending obliquely outwardly and away from said microphone, and downwardly below said microphone while said terminal is in handheld use in said opened operational state with said lower housing being rotated away from said upper housing.

17. The wireless telecommunication process of claim 16, further comprised of mounting said antenna to be borne by said lower portion of said lower housing to extend in a deployed operational position with said antenna extending obliquely outwardly and away from said microphone, and downwardly below said microphone while said terminal is in handheld use in said opened operational state with said lower housing being rotated away from said upper housing.

18. A wireless telecommunication process, comprising:

assembling a handset having an upper housing and a lower housing rotatably hinge-coupled to extend obliquely outwardly from a front face of said upper housing while said terminal is in an opened operational state, and to fold coextensively against said front face while said terminal is in a closed physical state;

positioning an earpiece at an upper portion of said upper housing;

disposing a keypad comprised of a plurality of keys, at an upper portion of a front face of said lower housing;

locating a variable visual display responsive to manual manipulation of said keys, below said earpiece;

installing a microphone below said keypad; and mounting an antenna in a lower portion of said lower housing to extend obliquely outwardly and downwardly below said microphone while said terminal is in handheld use and in said opened operational state.

19. The wireless telecommunication process of claim 18, further comprised of selecting the antenna from a group comprised of a plane monopole antenna, a plane dipole antenna, a slot antenna, a reverse F antenna, a reverse L antenna, and a micro-strip antenna.

20. The wireless telecommunication process of claim 18, further comprised of mounting said antenna by installing a whip antenna in said lower portion of said lower housing.

* * * * *